United States Patent
Sewell et al.

(10) Patent No.: US 9,386,798 B2
(45) Date of Patent: Jul. 12, 2016

(54) FLUIDIZED BED COFFEE ROASTER

(71) Applicant: Gourmet Coffee Roasters Inc., Wixom, MI (US)

(72) Inventors: Richard C. Sewell, West Bloomfield, MI (US); James N. Suddath, West Bloomfield, MI (US)

(73) Assignee: Gourmet Coffee Roasters Inc., Wixom, MI (US)

( * ) Notice: Subject to any disclaimer, the term of this patent is extended or adjusted under 35 U.S.C. 154(b) by 103 days.

(21) Appl. No.: 14/280,742

(22) Filed: May 19, 2014

(65) Prior Publication Data

US 2014/0314923 A1 Oct. 23, 2014

Related U.S. Application Data

(63) Continuation-in-part of application No. 13/370,792, filed on Feb. 10, 2012, now abandoned.

(51) Int. Cl.
*A23N 12/12* (2006.01)
*A23N 12/08* (2006.01)
*A23F 5/04* (2006.01)

(52) U.S. Cl.
CPC .............. *A23N 12/08* (2013.01); *A23F 5/046* (2013.01); *A23N 12/083* (2013.01); *A23N 12/125* (2013.01)

(58) Field of Classification Search
CPC ......... A23F 5/04–5/046; A23N 12/08–12/125; A47J 37/047; A47J 37/049
USPC ............ 426/466–467, 520, 524; 34/360–368, 34/576–586, 524–575
See application file for complete search history.

(56) References Cited

U.S. PATENT DOCUMENTS

| | | | |
|---|---|---|---|
| 2,220,749 A | 11/1940 | Adams | |
| 2,857,683 A | 10/1958 | Schytil | |
| 2,887,383 A | 5/1959 | Kopf | |
| 3,149,976 A | 9/1964 | Smith | |
| 3,285,157 A | 11/1966 | Smith | |
| 3,345,181 A * | 10/1967 | Smith, Jr. ................ | A23F 5/046 34/371 |
| 3,964,175 A * | 6/1976 | Sivetz .................... | A23N 12/08 34/589 |
| 4,169,164 A * | 9/1979 | Hubbard ................ | A23N 12/08 34/364 |
| 4,325,191 A * | 4/1982 | Kumagai ............... | A23N 12/12 34/571 |
| 4,484,064 A | 11/1984 | Murray | |
| 4,501,761 A * | 2/1985 | Mahlmann .............. | A23F 5/046 426/467 |
| 4,642,906 A * | 2/1987 | Kaatze ................... | A23N 12/08 34/168 |
| 4,698,916 A * | 10/1987 | Farber .................... | A23N 12/08 34/233 |
| 4,875,904 A | 10/1989 | Munk | |
| 4,949,632 A * | 8/1990 | Camerini Porzi ...... | A23N 12/12 34/364 |

(Continued)

*Primary Examiner* — Drew Becker
(74) *Attorney, Agent, or Firm* — Dinsmore & Stohl LLP (57) ABSTRACT

A fluidized bed coffee roaster controls air flow and/or temperature to maintain a desired time-temperature roast profile. The roaster may also provide a two stage quenching cycle for rapidly cooling roasted coffee beans to ambient temperature. In a first stage of the quenching cycle unheated air is passed through the roasted beans while they are still in the roasting chamber of the fluidized bed roaster. In a second stage of the quenching cycle which is carried out outside of the roasting chamber, in a fluidized bed quenching station, unheated air is flowed through, and fluidizes, the roasted coffee beans cooling them to ambient temperature.

7 Claims, 5 Drawing Sheets

(56) References Cited

U.S. PATENT DOCUMENTS

| | | |
|---|---|---|
| 5,185,171 A | 2/1993 | Bersten |
| 5,394,623 A * | 3/1995 | Sewell .................. A23N 12/08 34/494 |
| 5,609,097 A | 3/1997 | Newnan |
| 5,958,494 A | 9/1999 | Tidland et al. |
| 6,051,266 A | 4/2000 | Totsuka |
| 6,260,479 B1 | 7/2001 | Friedrich et al. |
| 7,875,833 B2 | 1/2011 | Song |
| 2001/0023544 A1 | 9/2001 | Krueger |
| 2004/0074400 A1 * | 4/2004 | Song ...................... A23N 12/10 99/483 |
| 2004/0142078 A1 * | 7/2004 | Eichner .................. A23N 12/08 426/466 |
| 2006/0266229 A1 * | 11/2006 | Ribich .................. A23N 12/12 99/486 |
| 2008/0089986 A1 * | 4/2008 | Song .................... A23N 12/125 426/466 |

* cited by examiner

FLUIDIZED BED COFFEE ROASTER

CROSS-REFERENCE TO RELATED APPLICATIONS

This patent application is a continuation-in-part of U.S. patent application Ser. No. 13/370,792, filed Feb. 10, 2012, entitled "Fluidized Bed Coffee Roaster Having Dual-Stage Quenching Cycle", now abandoned, the disclosure of which is incorporated herein by reference.

FIELD OF THE INVENTION

This invention relates to devices for roasting coffee, nuts, grains and other such materials. More specifically, the invention relates to a fluidized bed coffee roaster in which the coffee beans being roasted are at least partially suspended in a stream of heated air. In one aspect, the invention relates to a coffee roasting apparatus in which the temperature profile of the roasting beans is controlled on a continuing basis. In another aspect of the invention, the apparatus is operative to cool the heated, roasted beans to an ambient temperature in a two stage quenching cycle.

BACKGROUND OF THE INVENTION

Coffee is a beverage with global and growing appeal, and there is an ever-increasing demand for high quality coffee. Coffee beans must be roasted prior to brewing. Roasting is a process which causes a complex series of chemical changes in the beans wherein sugars and/or other organic compounds are pyrolized, and various volatiles are released so as to generate a complex pattern of flavor elements. In order to generate a good flavor profile, the roasting process must be very carefully controlled, in terms of time and temperature during both roasting and cooling. Under-roasted coffee produces a thin, latex-flavored, bitter beverage, while over-roasted coffee is oily and burnt tasting. Prolonged roasting, even at an appropriate temperature, volatilizes many of the flavor elements and produces a beverage of little taste. Roasting is further complicated by the fact that some of the reactions occurring during the roasting are exothermic, and as a consequence, the beans can readily become overheated even after being removed from a heat source. It will therefore be appreciated that roasting is a very complicated process, typically carried out by trained personnel.

A traditional roasting technique comprises tumbling the coffee beans in a heated drum. While the hardware for the process is relatively simple, control is difficult, and it is very easy to scorch and ruin the beans. A skilled roastmaster will control the application of heat to the drum so as to achieve a desired time-temperature roast profile; however, learning to do so is a lengthy process, and parameters which are used for one type of drum roaster will not transfer to another. Furthermore, smoke and oils generated in the process remain in contact with the beans and can confer a disagreeable taste.

As a consequence, the industry is turning to the use of fluidized bed roasters. In systems of this type, the coffee beans are at least partially levitated by a stream of heated air, and the degree of roasting is controlled by controlling the temperature of the air and the duration of the heating cycle. While fluidized bed roasters eliminate problems of contamination by smoke and oils, care must still be taken to avoid scorching the beans. Toward this end, prior art fluidized bed roasting systems typically include provisions for controlling the roast temperature and quenching the beans after they are roasted, as for example by an introduction of a stream of cool air or by spraying the beans with water. U.S. Pat. No. 4,484,064 discloses a fluidized bed coffee roaster in which ambient air is used for cooling. A somewhat similar system is disclosed in U.S. Pat. No. 5,185,171. U.S. Pat. Nos. 3,964,175 and 5,394623 both disclose the use of a water spray to cool the beans.

In all instances, the fluidized bed coffee roasters of the prior art provide only a simple roast profile in which temperature rises at a steady rate; there is no provision for holding the beans at a given temperature and/or decreasing the rate of heating during the roast cycle. As a result, prior art roasters cannot always provide for a complex roast profile. Likewise, prior art roasters carry out quenching the roasted beans in a single stage cycle carried out in the roasting chamber itself While such in-chamber, single stage quenching does produce an initial relatively quick drop in the temperature of the roasted beans, the present invention recognizes that residual heat in the roasting chamber, air delivery system, and other relatively massive components of the fluidized bed apparatus can slow the further cooling of the beans and thereby compromise the flavor profile of the roasted coffee.

As will be explained in greater detail hereinbelow, the present invention provides a fluidized bed coffee roasting system and method which can allow a user to implement a complex roast profile. Also, the system of the present invention can implement a two stage quenching cycle, wherein the roasted beans are first partially cooled in the roasting chamber during a first stage of the cycle and then discharged to a fluidized bed quenching system, which is separate from the roasting chamber, and in which they are rapidly cooled to an ambient temperature in a second stage of the cycle. These and other features and advantages of the present invention will be apparent from the drawings, description and discussion which follow.

BRIEF DESCRIPTION OF THE INVENTION

Disclosed is a fluidized bed coffee roaster which provides a controlled roast profile. The roaster has a roasting chamber including an air-permeable member which is supported in the chamber and which is operable to support a volume of coffee beans thereupon. The roaster further includes an air inlet disposed so as to introduce a stream of air into the chamber through the air-permeable member so as to pass through and fluidize the volume of coffee beans. An air outlet is disposed so as to direct the stream of air out of the chamber after it has passed through the volume of coffee beans. The roaster also includes a blower operable to provide the stream of air and an air duct operatively connecting the blower with the air inlet of the chamber. The roaster includes a heater, which is activatable to heat the stream of air, and this heater is disposed at a point downstream of the blower and upstream of the roasting chamber. A roast temperature sensor is disposed downstream of the heater and is operable to sense the temperature of the stream of air and generate a roast control signal which corresponds thereto.

The roaster of the present invention further includes a controller which is in operative communication with the roast temperature sensor, the blower, and the heater. The controller operates to selectably and independently activate and deactivate the heater and/or the blower. The controller has stored therein, a roast profile, which comprises a plurality of data points corresponding to a particular time and temperature. The controller operates on a periodic basis to read a roast control signal value, correlate that roast control signal value with the roast profile, and control the operation of the blower and/or the heater so as to maintain the temperature of the volume of coffee beans in accord with the roast profile.

In particular instances, sampling of the roast control signal by the controller takes place at intervals in the range of 60 to 180 seconds. In other instances, the sampling takes place at intervals, each of which constitutes 5-30% of the total roast time.

Also disclosed is a fluidized bed coffee roaster having a two-stage cooling cycle. The roaster of this embodiment is generally similar to the one described hereinabove, although it may or may not include a controller which operates to provide the controlled roast profile. However, the controller of this embodiment is in operative communication with the blower and the heater, and is operable, when the roast cycle is completed, to deactivate the heater while maintaining the operation of the blower and thereby initiate a first stage in a quenching cycle wherein the blower passes unheated air through the volume of coffee beans disposed in the roasting chamber.

The roaster of this embodiment further includes a fluidized bed quenching station comprising a container configured and operable to receive and retain the volume of coffee beans discharged from the outlet. The container has a bottom surface which is air-permeable. The fluidized bed quenching station further includes a quenchant air supply system disposed and operative, when activated, to deliver a stream of quenchant air through the bottom surface of the container, so as to fluidize and cool the volume of coffee beans in a second stage of the cooling cycle.

Further disclosed are methods for roasting coffee beans in the fluidized bed coffee roasters of the present invention, employing a controlled roast profile and/or a two-stage quenching cycle in which a first stage is carried out within a roasting chamber of the fluidized bed roaster by flowing a stream of unheated air through the beans, and a second stage of the cycle is carried out in a fluidized bed quenching station separate from the roasting chamber, wherein a second stream of unheated air is flowed through, and fluidizes the coffee beans so as to further cool them.

DETAILED DESCRIPTION OF THE INVENTION

The present invention, in a first aspect, is directed to a fluidized bed roaster for coffee beans and the like, which allows for the precise control of the time-temperature profile of the roasting beans. In a second aspect, the present invention is directed to a fluidized bed roaster which cools the roasted beans to an ambient temperature in a two stage quenching cycle. The present invention may be implemented in a number of different embodiments including fully automated, fluidized bed roasting systems as well as in roasting systems which are under at least partial manual control. One specific system incorporating the aspects of the present invention will be described with regard to FIG. 1, and it will be understood that the present invention may be otherwise embodied.

Figure 1:
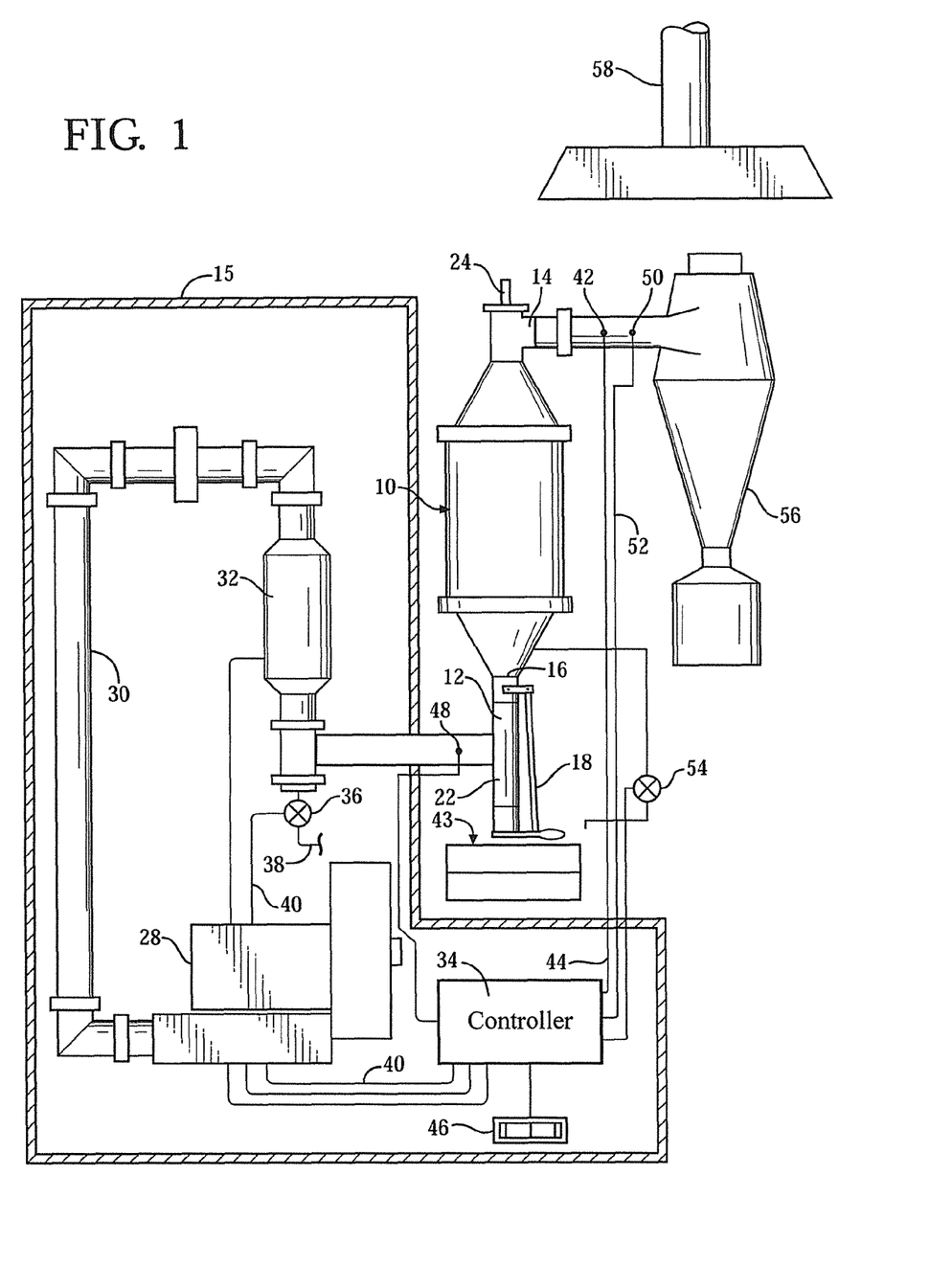
FIG. 1 is a schematic view of one embodiment of coffee bean roaster structured in accord with principles of the present invention.

Referring now to FIG. 1, there is shown a schematic depiction of a generalized fluidized bed coffee roaster structured in accord with the principles of the present invention. The roaster includes a roasting chamber 10 which retains the coffee beans during the roasting process. The roasting chamber 10 includes an inlet 12 for introducing a stream of air into the chamber and an outlet 14 for permitting the stream to exit. The chamber also includes a perforated plate or screen which is permeable to the airstream and which supports a volume of coffee beans thereupon.

The perforated plate 16 is hingedly connected to a lever 18 which is further connected to a bottom closure member 20 which seals a bottom outlet 22 of the roasting chamber 10. It will also be noted that the chamber 10 includes a fill cap 24 which closes the top end thereof. In a specific embodiment, at least the central, cylindrical portion 26 of the roasting chamber 10 is fabricated from a transparent material, preferably borosilicate glass or a high temperature polymer, so as to permit viewing of the beans while they roast.

Figure 2A:
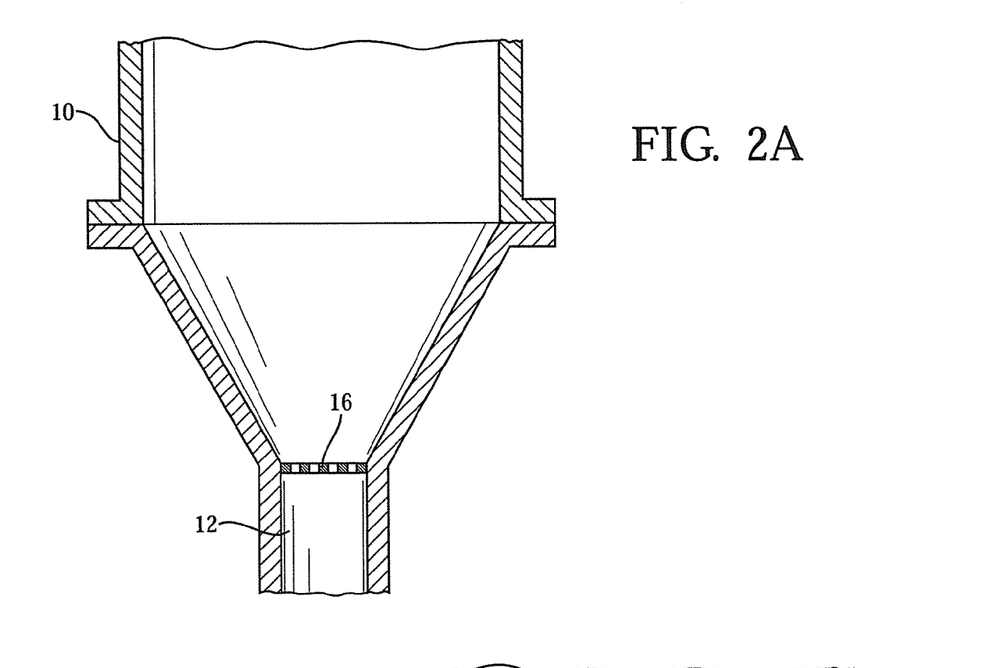
FIGS. 2A and 2B are cross-sectional views of a portion of the roaster of FIG. 1, showing the roasting chamber with a perforated plate in two different positions.
Figure 2B:
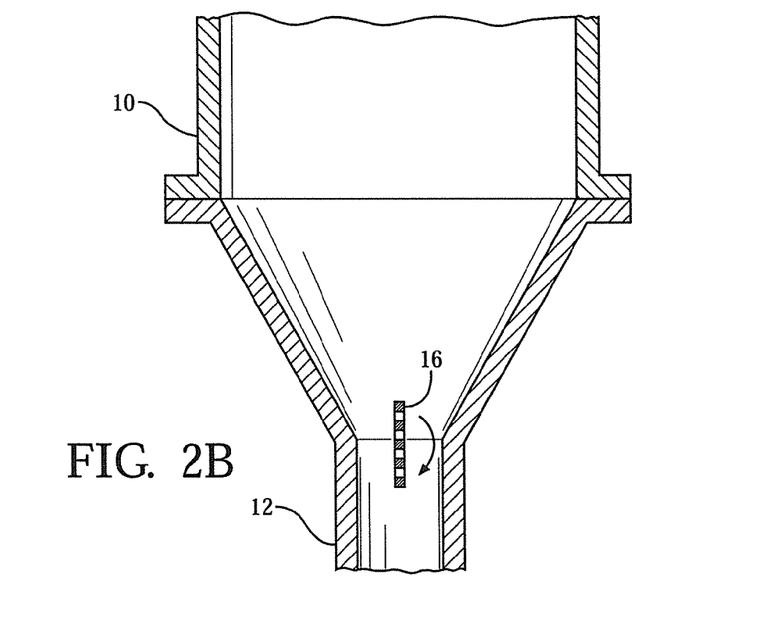

Referring now to FIGS. 2A and 2B, there is shown a cross section of a portion of the apparatus of FIG. 1 showing the roasting chamber 10, perforated plate 16 and inlet 12. In FIG. 2A, the perforated plate 16 is in a first position, in which it seals the bottom of the roasting chamber and retains a volume of coffee beans therein. FIG. 2B shows the plate 16 in a second position in which it permits discharge of the beans from the chamber. Movement of the plate 16 between the first and second positions may be accomplished manually, as for example by lever 18, or automatically as for example by an electromechanical actuator (not shown).

The system of FIG. 1 includes an air conduit 30, which communicates with the inlet 12 of the chamber 10. The conduit 30 is also in communication with a blower 28 and serves to direct a flow of air from the blower 28 into and through the chamber 10. Interposed downstream of the blower 28 and upstream of the chamber 10 is a heater 32 which heats the air passing through the conduit. The heater 32 is operatively connected to a controller 34 which selectively activates the heater 32 and/or blower 28 so as to control temperature of the heated air provided to the roasting chamber 10, as a function of time so as to implement a preselected roast profile.

The system of FIG. 1 optionally includes a water injection solenoid valve 36, operatively connected via a supply line 38 to a source of water, such as a water main, not shown. This water injection solenoid valve 36 is in electrical communication with the controller via a control line 40. It is to be understood that other embodiments may not include a water injection system.

The controller 34 may also be in electrical communication with a roast temperature sensor 42 which, in this embodiment, is disposed proximate the outlet 14 of the roast chamber 10. The roast temperature sensor 42 measures the temperature of the air which has passed through the volume of coffee beans and provides a roast control signal which is sensed by the controller 34 via control line 44. While the sensor 42 is shown in this embodiment as being disposed downstream of the roasting chamber 10, it may be disposed at any other location downstream of the heater 32.

In the operation of the FIG. 1 system a charge of coffee beans is placed into the roasting chamber 10 through the fill cap 24. The system is activated via a master switch 46 in communication with the controller 34. The controller activates the blower 28 so as to provide a stream of air which is directed through the conduit 30 to the roasting chamber 10. Once the air is flowing, the controller activates the heater (via an in line pressure switch) 32 so as to begin providing heated air to the chamber 10. As noted hereinabove, it is desirable that the heater be operated so as to control the time-temperature profile of the air. It has been found that if intense heat is applied to the beans too suddenly, the exterior of the beans may be overheated and burnt before sufficient temperature has been conducted to roast the interior of the beans; hence it is generally desirable that the controller activate the heater so as to provide a profiled application of heat. Activation may be in accord with a preset sequence resident in the controller or it may be further accomplished through the use of an air temperature sensor 48 which is in communication with the controller and which is disposed in the conduit 30 at a point downstream of the heater 32 and upstream of the roasting chamber 10.

It is a notable feature of the present invention that the controller operates to control the blower and/or heater so as to assure that the coffee beans being roasted follow a particular, preset, time-temperature roast profile. This allows for development of maximum coffee flavor. In the present invention the controller, unlike in the prior art, operates on a periodic, cyclic basis to read a roast control signal value generated by the roast temperature sensor. This value can be a direct indication of the temperature of the roasting beans, and in this regard can be a temperature measured either in or immediately at, the exit of the roasting chamber. In other aspects, the roast temperature sensor will measure a temperature which is correlatable with the temperature of the roasting beans. For example, the roast temperature sensor may measure the temperature of the air entering the chamber. In any instance, the controller operates to periodically read the roast control signal value and then processes the read signal so as to correlate it with a preselected roast profile. The controller then utilizes the information generated by this correlation to control the operation of the blower and/or the heater to maintain the temperature of the volume of coffee beans in accord with the desired roast profile. Given that the controller samples temperature on a periodic basis, adjustments may be readily implemented to accurately maintain the roast temperature in accord with the profile.

The time periods at which the controller reads and processes the roast control signal can vary depending upon the configuration of the apparatus, the volume of beans being roasted, and other needs. However, in particular embodiments each of the sampling periods has a duration which will be in the range of 5-30% of the total time during which the beans are being roasted. In specific instances, the periods may range from approximately 60 to 180 seconds during a 300 second roast cycle.

Figure 3A:
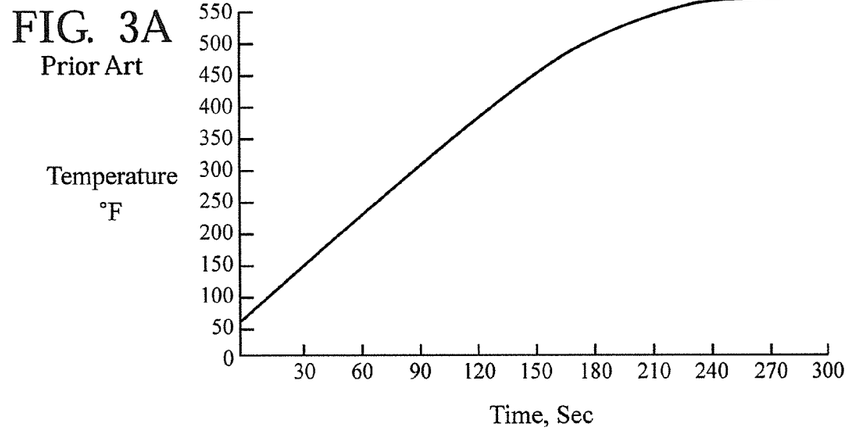
FIG. 3A is a graph depicting one particular roast temperature profile which may be implemented in a prior art roaster.

It is notable that the roast control system of the present invention allows for the implementation of roast profiles which were not achievable with prior art apparatus. Referring now to FIG. 3A, there is shown a time-temperature profile as achieved with a prior art fluidized bed roaster. The graph of FIG. 3A shows the temperature of heated air entering a roasting chamber, as measured by the temperature sensor 48 of FIG. 1, as a function of time. As will be seen, the air is initially at an ambient temperature of approximately 70° F. and rises at a fairly rapid rate for approximately 3 minutes to a temperature of 400° F. During the next 4 minutes, the temperature rises at a slower rate to approximately 540° F. While this roast profile minimizes exterior charring of the beans and provides for a good taste, the prior art control systems cannot provide for a more complex roast profile.

Figure 3B:
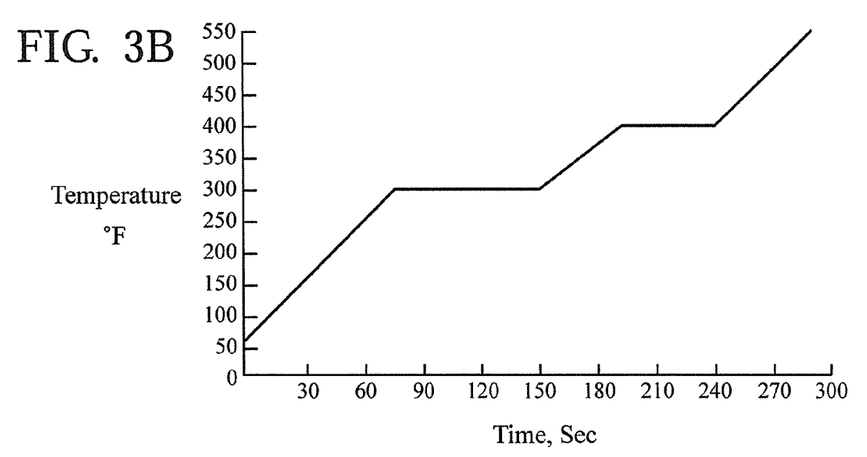
FIGS. 3B and 3C illustrate some particular roast profiles which may be implemented using the present invention.

FIG. 3B shows one type of profile which can be achieved through the use of the present invention. This profile is a "step and hold" profile and, as will be seen, the coffee beans are initially heated relatively rapidly from an ambient temperature to approximately 300° F. and then held at that temperature for approximately 1 minute. Thereafter, the beans are again heated to a temperature of approximately 400° F. and then held at a constant temperature for approximately 1 minute. These hold periods allow for particular temperature-dependent reactions such as Maillard reactions to take place, which fosters the development of complex flavor agents. Following the second period, the beans are then heated to a final temperature of approximately 540° F. after which they are quenched.

Figure 3C:
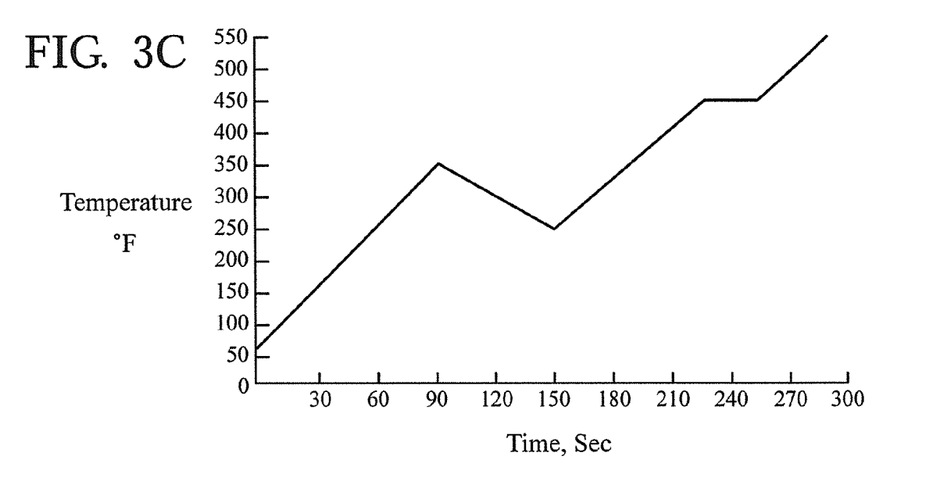

FIG. 3C shows another possible type of profile which can be implemented utilizing the present invention. As seen therein, the beans are initially heated from ambient to an intermediate temperature of approximately 350° F. and then allowed to cool back down to a temperature of approximately 300° F. over the span of 1 minute. Thereafter, the beans are heated to a temperature of approximately 450° F. over a one minute time span, and held for 30 seconds after which they are raised to a final temperature of approximately 540° F. and then quenched. The foregoing profiles are illustrative and will be appreciated that yet other temperature profiles may be readily implemented utilizing the present invention.

The roast profile being utilized is stored in the controller in electronic form. This profile may be a member of a library of stored profiles. In other instances the profile may be input directly by the user via a keyboard or other such device. In yet other instances, the controller may be operative to calculate an optimum roast profile based upon information concerning the coffee being roasted, as input by a user. For example, such information may comprise one or more of: degree of roast desired, the weight or volume of the beans being roasted, the water content of the beans, and the type of beans being roasted.

When the roasting is complete, the controller deactivates the heater 32 and initiates the cooling of the beans. This cooling may be via a single stage process carried out in the roast chamber in accord with the prior art or it may be via a two stage process in accord with the present invention. In the first stage of the two stage quenching cycle of the present invention, the blower 28 is maintained in operation, and air provided therefrom is considered "unheated" in the context of this disclosure, even though it may still be at a temperature warmer than ambient owing to residual heat in the system. Water may optionally be injected into the unheated air stream through the solenoid valve 36. The injected water quickly turns to steam, and in so doing cools the air stream and the conduit 30. The unheated air passes through the beans in the roast chamber and exits through the outlet 14 thereof.

Figure 4:
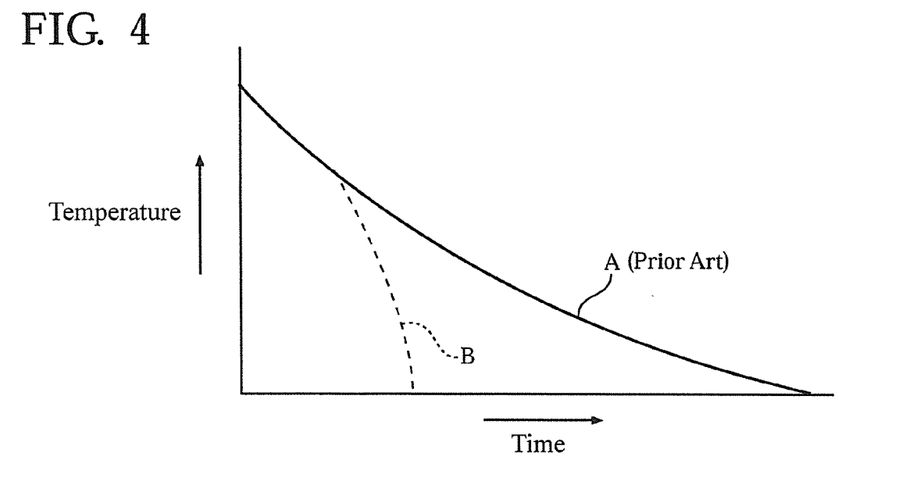
FIG. 4 is a graph comparing the cooling rate of coffee beans quenched in a two stage cycle of the present invention with that of coffee beans quenched in a one stage cycle of the prior art.
Figure 5:
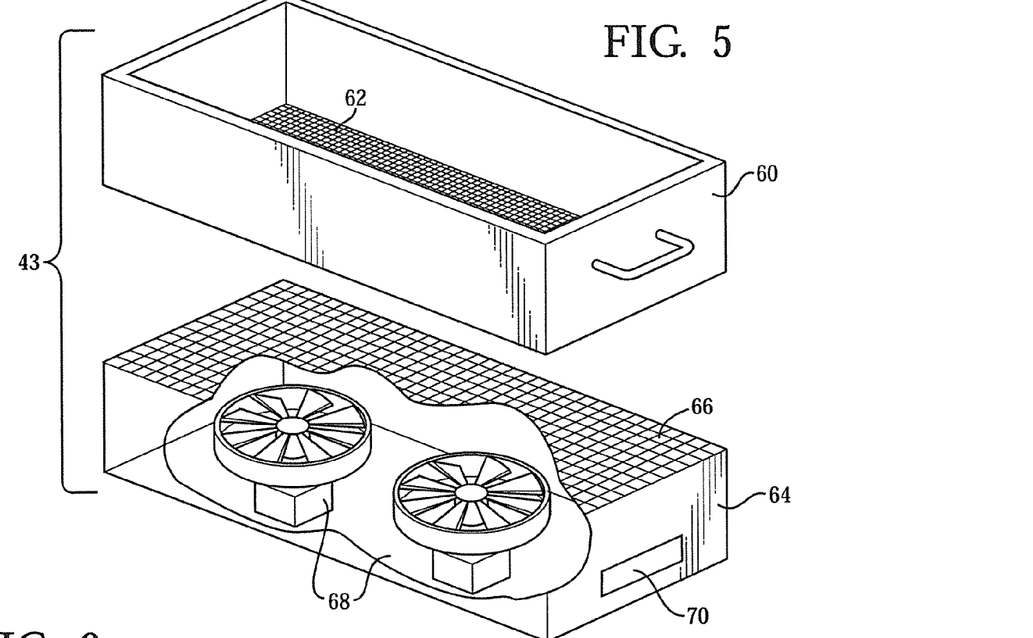
FIG. 5 is a partially cut-away drawing of a fluidized bed quenching station of the present invention.

As discussed above, in prior art systems, all cooling takes place in the chamber in a single stage process; however, residual heat in the heater, the conduits, and the roasting chamber slows the continued cooling of the roasted beans, and the present invention recognizes that this delayed cooling will interfere with the achievement of a maximum flavor profile in the roasted coffee. Referring now to FIG. 4, there is shown a graph of time versus temperature with regard to the cooling of a volume of coffee beans from a roast temperature to a fully quenched, ambient room temperature. Curve A shows a cooling profile typical of a single stage prior art quenching cycle. As will be seen, the beans initially cool at a fairly quick rate, but the rate of heat loss decreases giving the cooling profile a long "tail." Curve B shows the cooling profile achieved with the two stage quenching process of the present invention. In the first stage, which is carried out in the chamber, the rate of cooling is identical to that of the single stage process of the prior art; however, before the rate of cooling slows appreciably, the beans are removed from the chamber and cooled in a separate fluidized quenching bed. As will be seen, the beans reach ambient temperature very quickly avoiding the development of undesirable flavor profiles.

Following completion of the first stage of the quenching cycle, the air-permeable plate is rotated to its second position allowing the roasted (and still hot) beans to exit the chamber 10 through the outlet 22 which directs them to a fluidized bed quenching station 43 in which they are rapidly cooled to ambient temperature in the second stage of the quenching cycle.

Figure 6:
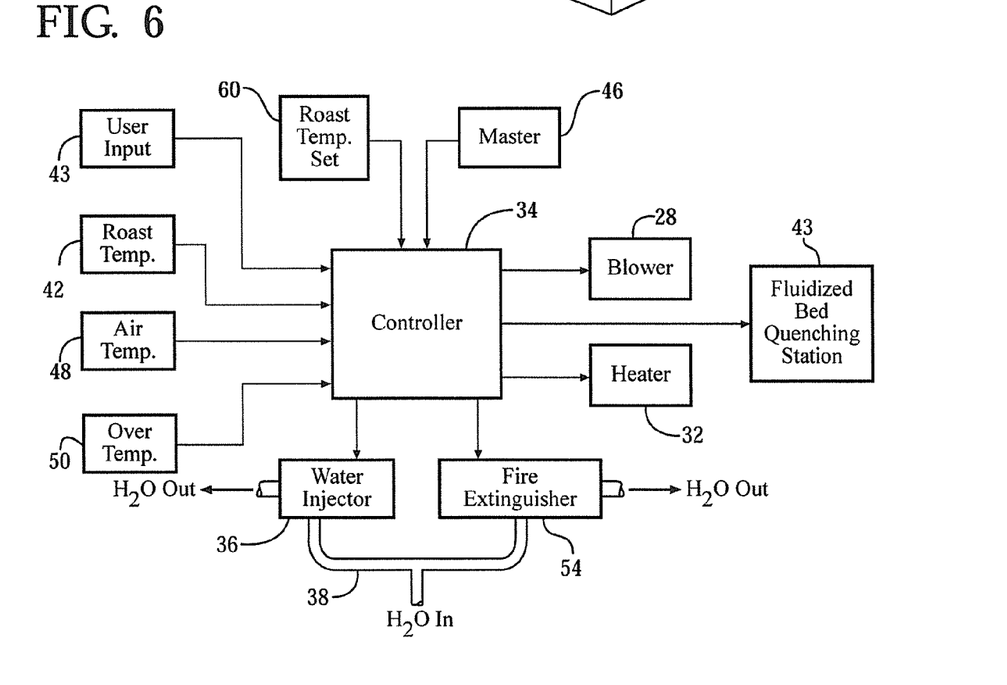
FIG. 6 is a block diagram of one embodiment of control system in accord with the present invention.

Referring now to FIG. 6, there is shown an exploded, partially cut-away view of an embodiment of a fluidized bed quenching station employed for the second stage of the quenching cycle. The station 43 includes a container 60 which is configured to receive discharged coffee beans from the outlet 22 of the roaster. The container 60 includes a bottom surface 62 which is air-permeable. This surface may comprise a screen or a mesh, a perforated body of solid material, or the like. The fluidized bed quenching station also includes a base 64 which is configured to support the container 60 thereupon. The base 64 includes an air-permeable upper surface 66 which, like the bottom surface of the container 62, may comprise a mesh or perforated body. The base 64, in this embodiment, includes a blower 68 therein which is operative to discharge a relatively high volume flow of air through the upper surface 66 of the base 64. In a typical implementation, the base will also include one or more openings, such as opening 70, to accommodate the inward flow of air to the blower 68. In alternative embodiments, the base 68 may not include a separate blower; but, may rely upon the blower 28, with appropriate conduits, to provide a stream of fluidizing air.

In the operation of the fluidized bed quenching station, the container 60 having the coffee beans disposed therein will be supported on the base 64 which operates to direct a volume of unheated cooling air through the air-permeable bottom surface 62 of the container 60 so as to at least partially levitate and fluidize the coffee beans. Given the fact that the components of the fluidized bed quenching station 43 will be at an approximately ambient temperature during this stage of the quenching cycle, and given the fact that the beans will be fluidized in a volume of unheated air, the roasted beans will cool very rapidly to ambient temperature thereby preserved in their flavor profile.

As further illustrated in FIG. 1, the basic system may include other refinements. For example, the system may include an over temperature sensor 50, shown here for example, in the outlet stream. The over temperature sensor functions to detect an emergency situation resultant from a fire in the roasting chamber or other such malfunction. The over temperature sensor 50 is in operative communication with the controller via a control line 52. Should an over temperature condition be detected, the controller 34 immediately deactivates the heater 32 and blower 28. The controller 34 may also activate the water injector 36 as well as a fire control water inlet 54 which floods the roasting chamber 10 thereby extinguishing any fire which may occur. As illustrated in FIG. 1, the system may include a cabinet 15, which houses the blower 28, controller 34, heater 32, and associated portions of the conduit 30.

Other equipment ancillary to the system may include a separator 56, such as a cyclonic separator which operates to collect the chaff generated during the roasting of coffee. The system may also include a vent hood 58 for exhausting heated air from the vicinity of the roaster. As discussed above the two stage quenching cycle of the present invention may be implemented in a variety of fluidized bed roasting systems, including fully automated systems as well as systems which are under partial or fully manual control.

Referring now to FIG. 6, there is shown a block diagram of a typical automated system such as that of FIG. 1. Shown is a controller 34 which is disposed to receive signals from a roast temperature sensor 42, an air temperature sensor 48, and an over temperature sensor 50. The controller also is in communication with a master switch 46 for activation of the system, and with a user input device 43 such as a keypad, which is used to input information utilized by the controller to select or calculate a roast profile.

Those embodiments which utilize a two-stage quenching cycle may include a roast temperature set switch 60 which inputs a selected roast temperature into the controller so that the controller may activate the two stage quenching cycle, when the preselected roast temperature is measured by the roast temperature sensor 42. As will be seen, the controller 34 is also in communication with the heater 32, blower 28, water injector 36 (when included), and the air supply portion of the fluidized bed quenching station 43.

In some embodiments, the roast temperature set switch 60 is dispensed with, and an optimized roast temperature is preprogrammed into the controller; but for other applications, it may be desirable to specify a particular roast temperature. As noted above, in this manner the degree of roasting may be controlled to provide a light, medium, or dark roast. Also, in some instances large volumes of beans will require somewhat lower final roast temperature as compared to a smaller volume of beans, to achieve an equivalent roast, because of higher back pressure in the roast chamber. It is to be understood that the controller 34 may comprise a single microprocessor based unit, or the controller may be a distributed control system comprised of a number of units which separately monitors and responds to various parameters such as the roast temperature, heater profile and over temperature condition. All of these variations are within the scope of the present invention.

In view of the foregoing, it will be appreciated that the invention may be practiced in a variety of configurations. The principles hereof may be adapted to very large volume roasters as well as relatively small systems for consumer use or point of purchase roasting. One particularly preferred system adapted for point of purchase roasting is operative to roast between 0.5 and 5 pounds of coffee at a time. The system includes a glass tube based roasting chamber. A particularly preferred heater comprises a high wattage, low volume heater which is configured to surround a portion of the air conduit. Heaters of this type are efficient and have a relatively small thermal mass, and hence provide for rapid heating and cooling. One preferred heater is sold by the Osram-Sylvania Corporation, and it has been found that the 10,000 watt, 208 volt, one phase model provides good performance in the aforedescribed system. This heater is preferably controlled via an SCR power controller. Such controllers are staple items of commerce and are available, for example, from the Whatlow Electric Manufacturing Co. There are a variety of blowers which may be employed in the present invention. One preferred blower for use in the roasting portion of the system is that sold by Gast Manufacturing under the designation R4110-2; another which may be used is available from Ametek Industrial Products under the designation Model 11901-01. The quenching station will typically incorporate a smaller blower, and one particular blower having utility in this invention available from the Dayton Electric Company. The temperature sensors are preferably thermocouples or thermistors, as is well known in the art. As noted above, the controller may comprise a single microprocessor based controller, or it may be a distributed system. There are available in the market a number of systems for controlling heaters, blowers and other heavy loads in response to thermocouple or thermistor input. One source of such controllers is the Watlow Corporation of Winona, Minn.

It will be appreciated from the foregoing, that the system of the present invention will be implemented in a variety of configurations. And while the invention has been described with particular regard to a coffee roaster, it is to be understood that the present invention may be practiced in conjunction with other types of food product roasters such as nut roasters. Therefore, it is to be understood that the foregoing drawings, discussion, and description are merely meant to illustrate particular embodiments of the invention, and are not meant to be limitations upon the practice thereof. It is the following claims, including all equivalents, which define the scope of the invention.

The invention claimed is:

1. A fluidized bed coffee roaster providing a controlled roast profile, said roaster comprising:
    a roasting chamber including an air-permeable member which is supported in said chamber and which is operable to support a volume of coffee beans thereupon;
    an air inlet disposed so as to introduce a stream of air into said chamber through said air-permeable member so as to pass through and fluidize said volume of coffee beans;
    an air outlet disposed so as to direct said stream of air out of the chamber after said stream of air has passed through the volume of coffee beans;
    a blower operable to provide said stream of air;
    an air duct operatively connecting said blower with the air inlet of the chamber so as to direct the stream of air from the blower to the inlet;
    a heater associated with the air duct at a point downstream of the blower and upstream of the roasting chamber, said heater, when activated, being operable to heat the stream of air;
    a roast temperature sensor disposed downstream of said heater, and operable so as to sense the temperature of the stream of air and generate a roast control signal corresponding thereto; and
    a controller which is in operative communication with the roast temperature sensor, the blower, and the heater, said controller being operable to selectably independently activate and deactivate the heater and/or blower, said controller having a roast profile electronically stored therein, said roast profile comprising a plurality of data points defining said roast profile, each point corresponding to a particular time and temperature, wherein said roast profile is a step profile which includes: a first time interval during which the temperature of said volume of coffee beans is increased from a first temperature value to a second temperature value, a second time interval during which said volume of coffee beans is maintained at said second temperature value, and a third time interval during which the temperature of said volume of coffee beans is increased from said second temperature value to a third temperature value;
    said controller being further operative, on a periodic, cyclic basis to:
      read a roast control signal value;
      correlate said roast control signal value with said roast profile; and
      control the operation of said blower and/or heater so as to maintain the temperature of said volume of coffee beans in accord with said roast profile.

2. The fluidized bed coffee roaster of claim 1, wherein said periodic, cyclic basis constitutes a plurality of periods each in the range of 5% to 30% of the roast profile.

3. The fluidized bed coffee roaster of claim 1, wherein said periodic, cyclic basis constitutes a plurality of periods each in the range of 60 to 180 seconds.

4. The fluidized bed coffee roaster of claim 1, wherein said roast temperature sensor is disposed either in the roasting chamber, or immediately at the exit of the roasting chamber and is operable so as to sense the temperature of the stream of air in said roasting chamber.

5. The fluidized bed coffee roaster of claim 1, wherein said roast temperature sensor is disposed and operable so as to sense the temperature of the stream of air upstream of said roasting chamber.

6. The fluidized bed coffee roaster of claim 1, wherein said roast temperature sensor is disposed and operable so as to sense the temperature of the stream of air at a point downstream of said roasting chamber.

7. The fluidized bed coffee roaster of claim 1, further including:
    a discharge outlet which is operable to discharge the volume of coffee beans from said roasting chamber; and
    a fluidized bed quenching station in communication with said controller, said fluidized bed quenching station comprising: a container configured and operable to receive and retain the volume of coffee beans from said discharge outlet, said container having a bottom surface which is air-permeable; and a quenchant air supply system disposed and operative, when activated by said controller, to deliver a stream of quenchant air through the bottom surface of said container, so as to fluidize and cool said volume of coffee beans.

* * * * *